US008456531B2

(12) United States Patent
Winkler

(10) Patent No.: US 8,456,531 B2
(45) Date of Patent: Jun. 4, 2013

(54) VIDEO ALIGNMENT AND CALIBRATION FOR VIDEO QUALITY MEASUREMENT

(75) Inventor: Stefan Winkler, Singapore (SG)

(73) Assignee: Cheetah Technologies, L.P., Pittsburgh, PA (US)

( * ) Notice: Subject to any disclaimer, the term of this patent is extended or adjusted under 35 U.S.C. 154(b) by 391 days.

(21) Appl. No.: 12/687,742

(22) Filed: Jan. 14, 2010

(65) Prior Publication Data

US 2011/0169963 A1   Jul. 14, 2011

(51) Int. Cl.
  *H04N 17/00* (2006.01)
  *H04N 17/02* (2006.01)
  *H04N 9/475* (2006.01)
(52) U.S. Cl.
  USPC ............................................ 348/192; 348/518
(58) Field of Classification Search
  USPC ................... 348/180–194, 510, 512, 518
  See application file for complete search history.

(56) References Cited

U.S. PATENT DOCUMENTS

| 7,705,881 B2 * | 4/2010 | Okamoto et al. ............. 348/180 |
| 2006/0152585 A1 * | 7/2006 | Bourret et al. ................ 348/180 |
| 2006/0262191 A1 | 11/2006 | Straney et al. |
| 2006/0276983 A1 | 12/2006 | Okamoto et al. |
| 2009/0274390 A1 | 11/2009 | Meur et al. |

OTHER PUBLICATIONS

PCT Search Report and Written Opinion for International Application No. PCT/US2011/021118 dated Sep. 16, 2011.

* cited by examiner

*Primary Examiner* — Michael Lee
(74) *Attorney, Agent, or Firm* — Patterson & Sheridan, L.L.P.

(57) ABSTRACT

Video alignment and calibration, which is needed for video quality measurement in full-reference mode, is performed continuously on the videos being measured to account for alignment parameters that may change over time. With this technique, the quality of video files and/or live video streams can be measured in full-reference mode in real-time. During video alignment, the temporal and spatial offsets, as well as any spatial, luminance or color transformations between the two videos are measured; during video calibration, the video frames are adjusted for these offsets and transformations so that the video quality can be measured correctly.

9 Claims, 5 Drawing Sheets

VIDEO ALIGNMENT AND CALIBRATION FOR VIDEO QUALITY MEASUREMENT

BACKGROUND OF THE INVENTION

1. Field of the Invention

Embodiments of the present invention relate generally to video systems and, more particularly, to methods and systems for aligning and calibrating videos for video quality measurement.

2. Description of the Related Art

In order to evaluate a video system, it is often necessary to compare videos of the same scene, coming from different sources, different delivery paths, different encoders, different bitrates, etc. This procedure is known as video quality measurement in full-reference mode. For this measurement to yield meaningful results, the two videos must be carefully aligned and calibrated in terms of temporal delay and spatial transformations, before the actual quality assessment can be carried out.

Video alignment and calibration techniques that have been employed in the art compute average temporal and spatial shifts of the frames in the videos being compared and apply those shifts to the entire video during calibration. These techniques cannot handle temporal shifts that vary throughout the video, which are commonly introduced by network losses or buffering issues, and therefore do not always produce accurate results. Other aspects often ignored by conventional methods are possible spatial transformations (e.g., slight stretching or rotation of the video frame) and luminance/color changes (e.g., the test video is brighter than the reference). Finally, carrying out the alignment, calibration, and quality measurement steps in real time is essential for the live evaluation of operational video processing components.

SUMMARY OF THE INVENTION

One or more embodiments of the invention provide techniques to automatically and continuously compute temporal delay, spatial transformations, and luminance/color changes. These techniques can handle variations of the alignment parameters over time, and work on video streams in real-time.

One embodiment of the invention provides a novel method of aligning two video streams for evaluating the quality of one relative to the other. Another embodiment of the invention provides a method of measuring video quality that employs novel video alignment and calibration techniques. A system according to an embodiment of the invention is directed to a video quality measurement system that implements the novel video alignment and calibration techniques.

A method of aligning two live video streams, according to an embodiment of the invention, includes the steps of receiving a test video stream and a reference video stream, selecting a frame from the test video stream and a block within the selected frame, finding a frame in the reference video stream that has a block that best matches the selected block in the test video stream, and adjusting the temporal and spatial shifts between the two video streams. This method can be used continuously and in real-time on live video streams.

A method of measuring video quality, according to an embodiment of the invention, includes the steps of aligning test and reference videos temporally, and performing a spatial transformation and a luminance/color adjustment on one of the videos, i.e., the video to be evaluated. After the alignment and the adjustment, a quality result is generated based on a comparison between the two videos.

A video quality measurement system according to an embodiment of the invention is configured to evaluate the quality of a video stream. The system includes a network interface through which a test video stream and a reference video stream are received, an alignment module for temporally aligning the test video stream with a reference video stream as the video streams are being received, and a quality evaluation module for comparing frames from the test and reference video streams after they have been aligned, and continuously generating a quality measurement result.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

The video alignment and calibration techniques according to one or more embodiments of the invention is designed to detect various changes in the spatial and temporal structure, as well as luminance and color, between two videos, referred to herein as video A and video B. The videos can be file-based sequences, or video streams being captured in real-time. Both videos have the same content in terms of scene. In some cases, video A is the reference video and video B is directly derived from video A, e.g., through an encoding process or similar types of processing. In other cases, both video A and video B may be derived from a third video, e.g. through an encoding process with different parameters. The two videos are assumed to have the same underlying frame rate (if this is not the case, the videos may be interpolated to the same underlying frame rate), so that temporal shifts can be expressed in numbers of frames. The two videos are also assumed to be approximately the same resolution and frame size (if this is not the case, the frames may be interpolated to roughly the same resolution and frame size).

The video alignment and calibration according to one or more embodiments of the invention works in three consecutive steps. The first step detects temporal delay and spatial shifts between the two videos and aligns them. The second step detects spatial scaling and other geometric transformations. The third step detects luminance and/or color gains and offsets. All three steps are based on finding the smallest pixel differences (e.g., minimizing mean-squared error) between blocks from the two videos. If the videos are interlaced, the alignment should be done on fields rather than frames. For simplicity, the term "frame" as used in this application is meant to cover both frames and fields.

Figure 1A:
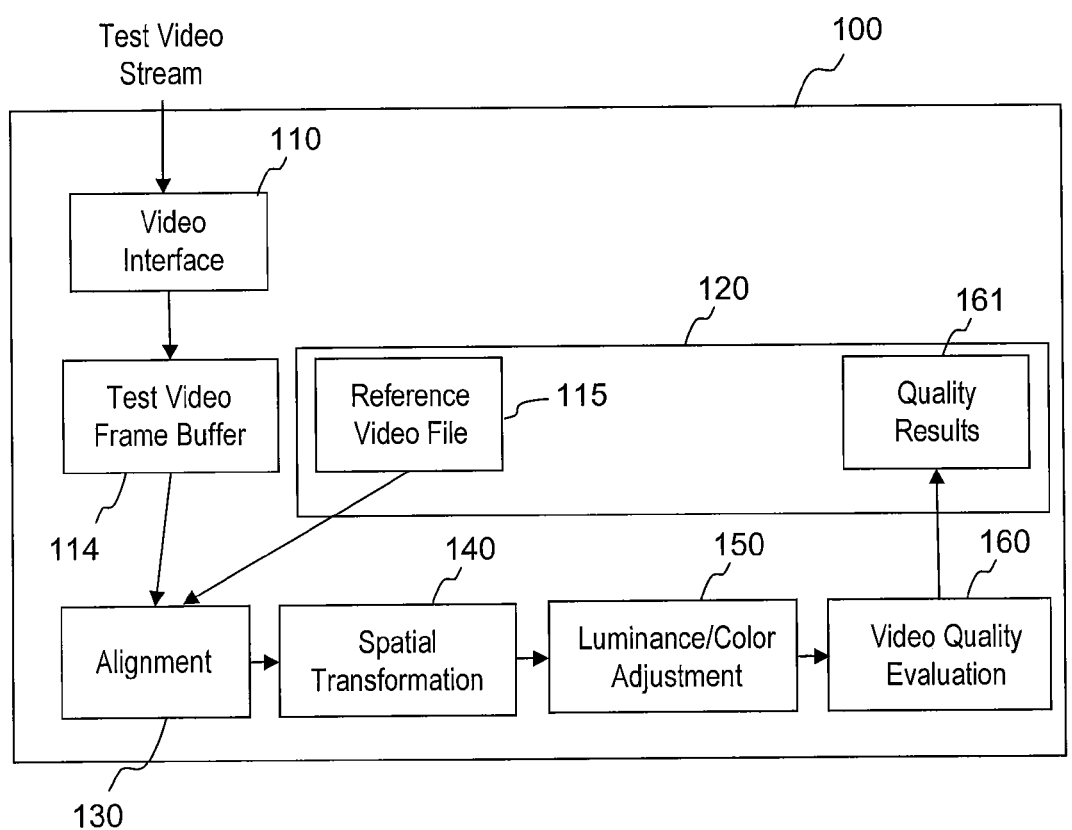
FIGS. 1A and 1B are block diagrams of a video quality measurement system according to two possible embodiments of the invention.
Figure 1B:
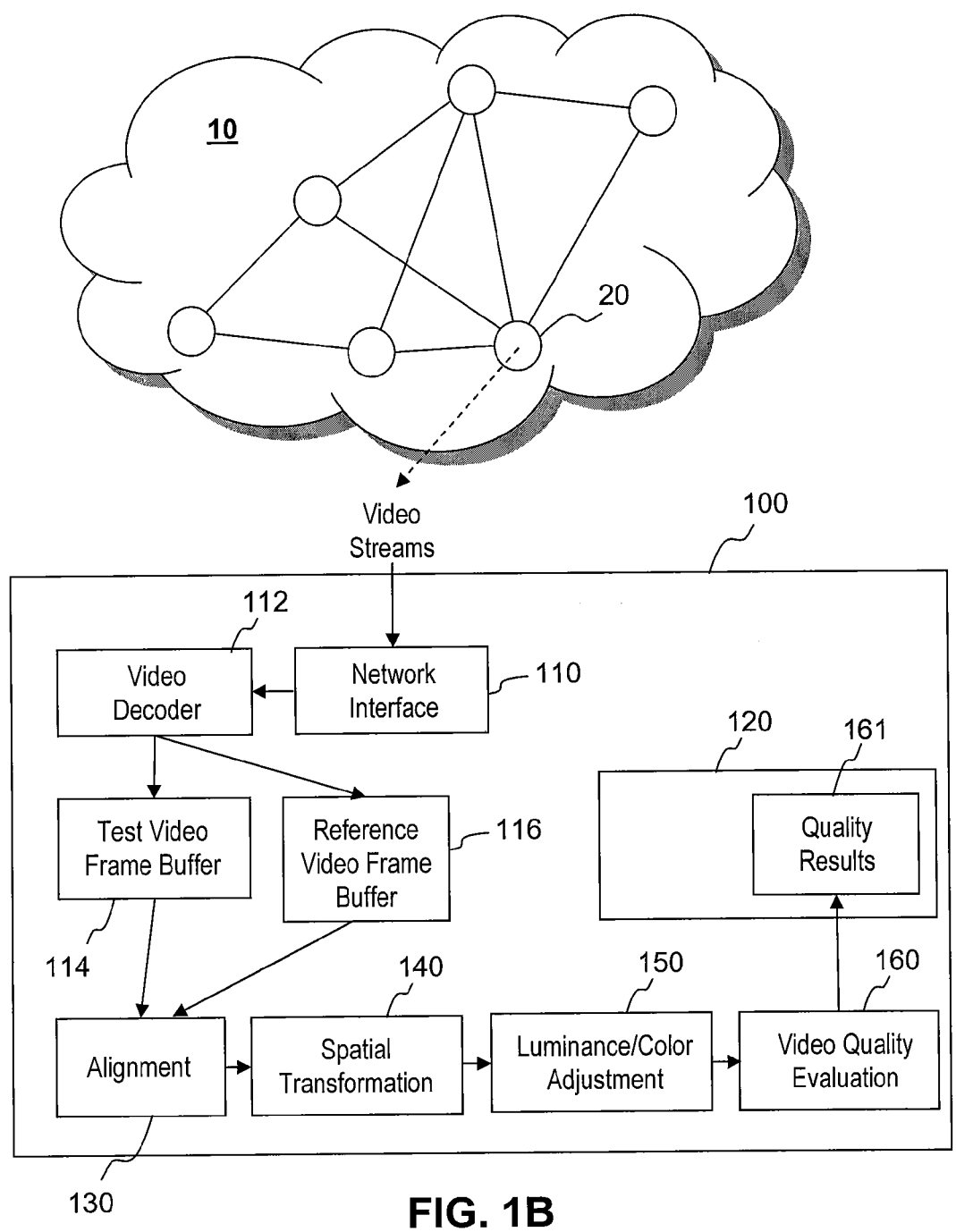

FIGS. 1A and 1B are block diagrams of a video quality measurement system according to embodiments of the invention that implement the three steps described above. The video quality measurement system of FIGS. 1A and 1B is a computer system 100 that includes conventional components of a computer, e.g., a processing unit, system memory, persistent storage unit, and I/O devices including an adapter for connection to computer network 10.

In the implementation of FIG. 1A, video interface 110 receives an uncompressed test video stream. A certain number of frames are stored in test video frame buffer 114. From test video frame buffer 114, the test video data is sent to alignment module 130 for temporal and spatial alignment with respect to a reference video stream that is generated from a reference video file 115 stored in storage unit 120, which may be, for example, a persistent storage unit. If a spatial transformation between the videos is detected, it is corrected in spatial transformation module 140. After spatial transformation, luminance and/or color gains and offsets are detected and corrected by luminance/color adjustment module 150. Video data that is output from luminance/color adjustment module 150 represents corrected video data and video quality evaluation module 160 carries out the video quality measurements according to methods known in the art. The video quality results 161 are stored in storage unit 120.

As shown in FIG. 1B, the video quality measurement system may be implemented within a network 10 illustrated as a cloud to perform video quality measurements at a node in network 10, e.g., node 20. In the implementation of FIG. 1B, network interface 111 receives streaming video data from computer network 10. Video decoder module 112 decodes both the test and reference video streams from the streaming video data. A certain number of decoded frames from each stream are stored in test and reference video frame buffers 114 and 116, respectively. The decoded test video and the decoded reference video are sent to alignment module 130 for temporal and spatial alignment. If a spatial transformation between the videos is detected, it is corrected in spatial transformation module 140. After spatial transformation, luminance and/or color gains and offsets are detected and corrected by luminance/color adjustment module 150. Video data that is output from luminance/color adjustment module 150 represents corrected video data and video quality evaluation module 160 carries out the video quality measurements according to methods known in the art. The video quality results 161 are stored in storage unit 120.

The embodiment according to FIG. 1B assumes that the streaming video data contains both the test and reference video streams. In some embodiments, the reference video streams may not be contained in the streaming video data but instead stored as a file in storage unit 120 of the video quality measurement system.

In the embodiments of the present invention described above, the frame buffers are implemented as system memory, such as DRAM, and the different modules depict the processing unit of computer system 100 that has been programmed to carry out the functions of each of the modules. The functions of each of the modules are described in further detail below.

The invention may be applied to streaming or non-streaming video, e.g., video files stored in the system. Both test and reference video streams may be received through the interfaces; only one of the two streams may be received through the interface and the other one stored in storage unit 120; or both test and reference video streams may be stored in storage unit 120. Depending on the type of interface, both test and reference video streams may be received through the same network/video interface, or two network/video interfaces may be used to receive both streams. One or both video streams may be encoded, in which case they have to be decoded before alignment and calibration; alternatively, one or both video streams may be received or stored in uncompressed baseband format. The size of the video frame buffer (s) and the number of frames stored within is determined by the maximum temporal delay expected.

The sign convention used herein expresses shifts with respect to video A, which in the embodiments described herein is the reference video. For example, a temporal delay of X frames means Frame No. X+N in video B corresponds to Frame No. N in video A. A positive temporal delay thus means video B is ahead of video A, whereas a negative delay means video B is behind video A.

Detecting temporal delay and spatial shifts between the two videos is the first step. The result of this step could be a delay of −2 frames, a horizontal offset of +5 pixels, and a vertical offset of 0 pixels, for example. For this step, a block in video B is selected and video A is searched for a matching block through a search process. The block can be as large as the entire frame, or it can be just a small part of the frame. As mentioned before, matches are based on pixel differences (e.g. in terms of mean-squared error or similar measures) between blocks. The best match of two blocks is thus defined as the one with the lowest mean-squared error across the search space. Because this can be considered a global optimization problem, and because the comparison is based on pixel differences, temporal and spatial search have to be performed in combination. The geometric and luminance/color transformations discussed below are carried out after this first step, as they are based on a pair of matching frames.

For performance reasons, the search space should be constrained. The following constraints may be imposed: (1) Assume certain initial temporal and spatial shifts (e.g. +5 frames, 0 pixels horizontally, −10 pixels vertically); (2) Limit the search range for temporal and spatial shifts (e.g. maximum delay of ±30 frames, maximum horizontal and vertical offset of ±16 pixels); (3) Use optimized block-matching strategies, such as pyramid search, diamond search, etc.; and (4) Limit the size of the block used for matching (e.g. 64×64 pixels).

After temporal delays and spatial offsets are determined, they are applied during the calibration step. During calibration, any temporal delays detected are corrected by accessing the corresponding frames from the video, and spatial offsets are corrected by shifting the image regions in one frame to match with the corresponding regions in the other according to the spatial offsets detected.

Figure 2:
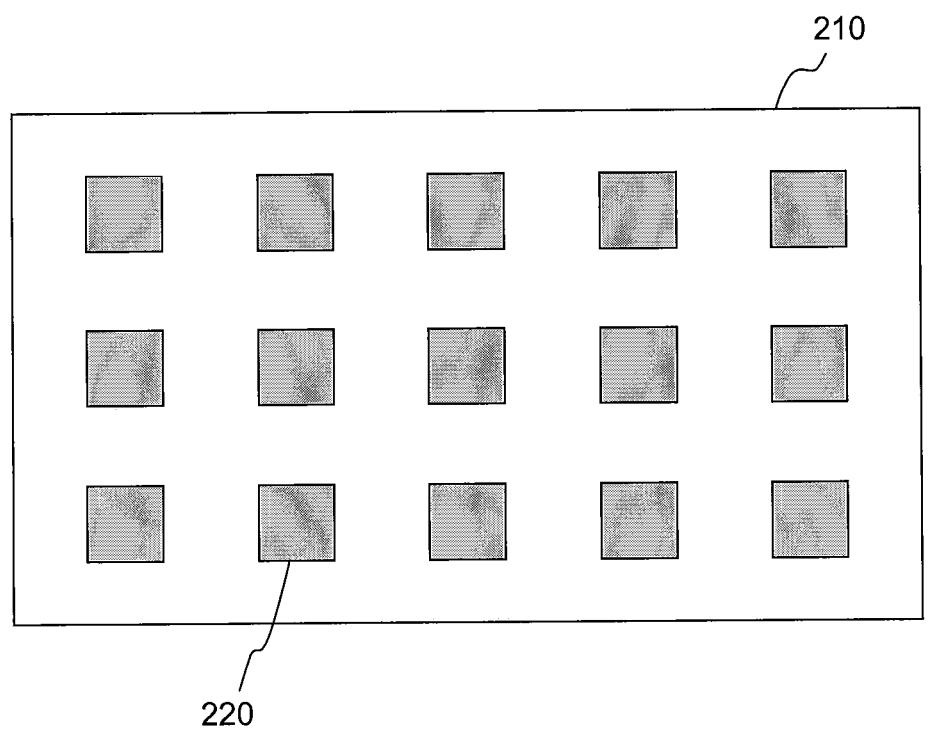
FIG. 2 depicts an example of a block grid that may be used for detection of spatial scaling and other transformations.

Once the best-matching frames from the two videos have been found, we can detect spatial geometric transformations. For this step, we arrange blocks on a virtual two-dimensional grid on the frame from video B (or "frame B"). One example of such a grid is depicted in FIG. 2. FIG. 2 shows a two-dimensional grid 210 having a plurality of blocks 220; the block arrangement may or may not be as regular as the one shown in FIG. 2.

For each of the blocks in a frame from video B, a search is conducted for the best-matching block in the corresponding frame in video A (or "frame A"), and the horizontal and vertical shifts between the two are stored. This results in an array of vectors describing the relative shifts of each block with respect to its original position in video A. This is similar to the process of block-based motion estimation, which is commonly performed by video encoders.

The geometric transformation can be expressed in matrix form as follows:

$$\begin{bmatrix} x_B \\ y_B \\ 1 \end{bmatrix} = \begin{bmatrix} s_x\cos\theta & s_y\sin\theta & t_x \\ -s_x\sin\theta & s_y\cos\theta & t_y \\ 0 & 0 & 1 \end{bmatrix} \begin{bmatrix} x_A \\ y_A \\ 1 \end{bmatrix}$$

Here $x_A$ and $y_A$ are the coordinates of a block in frame A, and $x_B$ and $y_B$ are the coordinates of a block in frame B. $t_x$ and $t_y$ represent the stored horizontal and vertical shifts, which were previously calculated. $s_x$ and $s_y$ represent horizontal and vertical scaling factors, and $\theta$ is the rotation angle. The transform matrix can be made more general, for example, to allow for shears, or more constrained, e.g. disallowing rotation by forcing $\theta$ to be zero.

Using the absolute positions and relative motion vectors between frames A and B for each block, an over-determined linear system based on this transformation can be constructed. The coefficients of the transform matrix can then be computed through linear least-squares or similar methods. Care should be taken to exclude spurious vectors from this step that do not point to the actual corresponding block in the other frame. This can be done by additionally checking indicators of reliability, such as the spatial activity within each block used for matching. Once the transform matrix is determined, it (or its inverse) can be used for spatial calibration of the two videos by subjecting the entire frame to the transformation.

The last step computes the global luminance and color changes between frame A and frame B. For this, a technique known as histogram matching is used. First, the histograms for each of the luminance/color values (typically Y, U and V color components) for frame A and B are computed. This is followed by an inverse interpolation of the cumulative histograms, which yields a lookup table (LUT) of pixel values as a function of cumulative histogram levels. In the final step, a mapping between the LUT of frames A and B is computed. This mapping can be linear, in which case it can be determined by a regression. However, other non-linear mapping functions may be used as well. For a linear mapping function, the regression yields a gain and an offset of (Y, U or V) pixel values between the two frames, respectively. For calibration, any luminance/color changes detected are then corrected by applying the transformation to the respective channels of video A.

For reasons of performance, the detection of spatial transformations and/or luminance/color changes may not be carried out at every frame; instead, it could only be verified at certain time intervals, at a scene change, or based on other criteria. Nonetheless, the corresponding calibration must be carried out for every frame.

Figure 3:
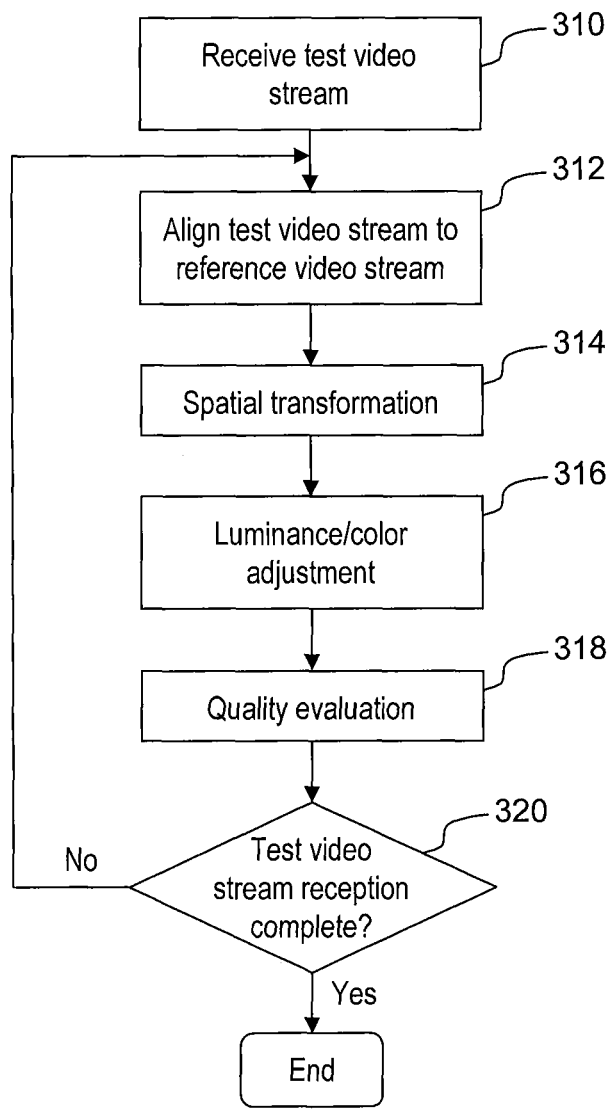
FIG. 3 is a block diagram illustrating a method for measuring video quality according to an embodiment of the invention.

FIG. 3 is a block diagram illustrating a method for measuring video quality according to an embodiment of the invention. Computer system 100 shown in FIGS. 1A and 1B is used to carry out this method, but the method is not limited thereto. Other systems that are capable of carrying out the steps in this method are also within the scope of this invention.

In this embodiment, video quality is measured in real-time. Two video streams are being received in step 310, e.g., by network interface 110. One is the test video stream, and the other is the reference video stream. In step 312, the video streams are aligned in the manner disclosed above, e.g., by alignment module 130. Spatial transformation (step 314) and luminance/color adjustment (step 316) are also carried out in the manner described above, e.g., by spatial transformation module 140 and luminance/color adjustment module 150, respectively. Quality evaluation is carried out in step 318 according to methods known in the art by comparing the streaming video that has undergone corrections through steps 312, 314 and 316, and the reference video stream. Quality evaluation is continuously performed at periodic intervals so long as the video streams are being received, which is determined by the check in step 318. The method ends if the check in step 318 determines that the streaming video reception has completed.

Figure 4:
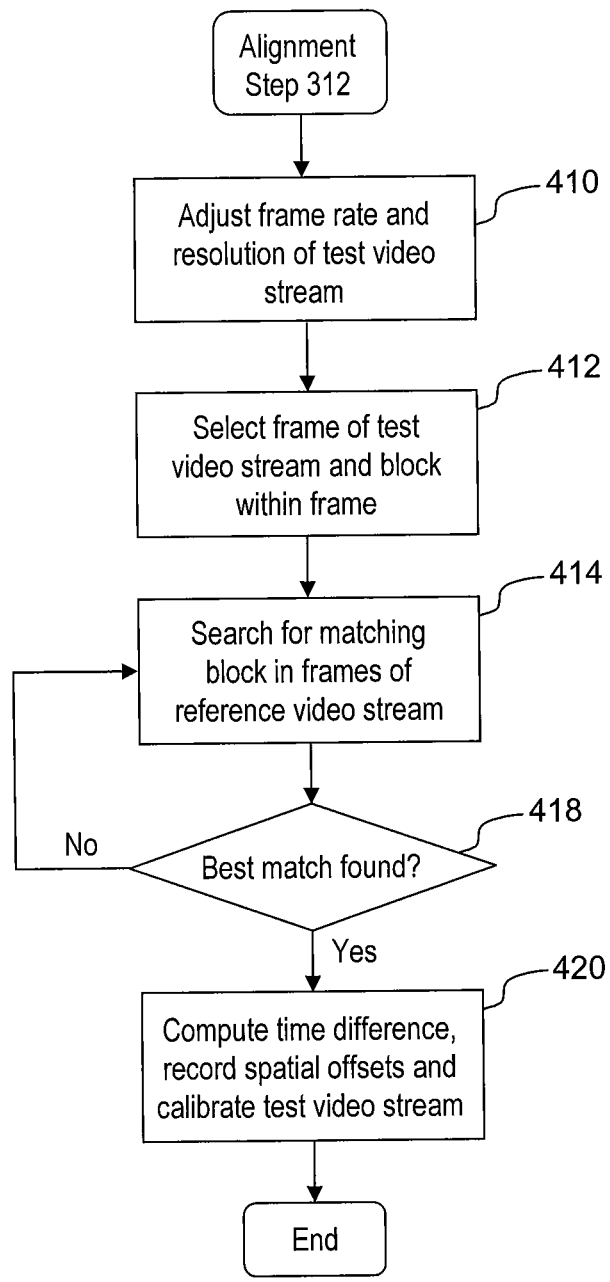
FIG. 4 is a block diagram of a method for aligning a streaming video with a reference video stream according to an embodiment of the invention.

FIG. 4 is a block diagram that further details step 312 of the method shown in FIG. 3. The alignment step begins with step 410, in which the frame rate and resolution of test video stream is adjusted through interpolation techniques to match the reference video stream. Then, in step 412, a frame from video stream A, e.g., the most recently received frame, and a block within that frame are selected. The search for a matching block in frames of the reference video stream B is carried out in step 414. If the best match is found as determined in step 418, the flow proceeds to step 420, where the time difference between the two videos is computed, the spatial offsets recorded, and the streaming video calibrated based on the time difference and the recorded spatial offsets. If the best match is not found, the flow returns to step 414.

While the foregoing is directed to embodiments of the present invention, other and further embodiments of the invention may be devised without departing from the basic scope thereof, and the scope thereof is determined by the claims that follow.

What is claimed is:

1. A method of aligning a first video and a second video, comprising the steps of:
   selecting a frame from the first video;
   selecting a block within the selected frame;
   finding a frame in the second video that has a block that best matches the selected block;
   adjusting a time reference of one of the first and second videos based on a time difference between the frame in the second video and the selected frame; and
   performing a spatial geometric transformation of one of the first and second videos based on matches of a plurality of blocks within the first video to corresponding blocks in the second video.

2. The method according to claim 1, further comprising the step of:
   continuously adjusting the time reference of the first video.

3. The method according to claim 2, wherein the step of continuously adjusting includes the sub-steps of:
   (a) after a predetermined amount of time has elapsed since the last adjustment, selecting a recent frame from the first video that has been received since the initial adjustment;
   (b) selecting a block within the selected recent frame;
   (c) finding a frame in the second video that has a block that matches the selected block;
   (d) adjusting a time reference of one of the first video and the second video based on a time difference between the frame in the second video found in sub-step (c) and the selected recent frame from the first video; and
   (e) repeating steps (a) through (d) for the duration of the videos.

4. The method according to claim 2, wherein the step of continuously adjusting is carried out in real-time as video files for the first and the second videos are played or as video streams for the first and the second videos are being received.

5. The method according to claim 1, further comprising the step of:
processing the first video to have approximately the same frame rate and resolution as the second video.

6. The method according to claim 1, wherein one or both of the first and the second videos are included in streaming video received over a network connection, and wherein the step of adjusting is carried out at a node in the network.

7. A method of measuring video quality, comprising the steps of:
(a) aligning first and second videos temporally, wherein the first video is a reference video and the quality of the second video is being evaluated against the first video, the one or both videos are live video streams being received or captured through network or video interfaces, and the second video is temporally aligned with respect to the first video more than once as the second video is being received, wherein the aligning includes:
selecting a frame from the second video,
selecting a block within the selected frame,
finding a frame in the first video that has a block that best matches the selected block, and
adjusting a time reference of the second video based on a time difference between the frame in the first video and the selected frame;
(b) performing a spatial transformation of one of the first and second videos after step (a);
(c) performing a luminance and color adjustment on one of the first and second videos after step (b); and
(d) comparing the first and second videos to generate a quality measurement.

8. A method of measuring video quality, comprising the steps of:
(a) aligning first and second videos temporally, wherein the aligning includes:
selecting a frame from the first video,
selecting a block within the selected frame,
finding a frame in the second video that has a block that best matches the selected block, and
adjusting a time reference of the first video based on a time difference between the frame in the second video and the selected frame;
(b) performing a spatial transformation of one of the first and second videos after step (a);
(c) performing a luminance and color adjustment on one of the first and second videos after step (b); and
(d) comparing the first and second videos to generate a quality measurement;
wherein one of the first and second videos is not available in its entirety when steps (a) through (d) are carried out.

9. The method of claim 1, further comprising the step of:
performing a luminance and color adjustment on one of the first and the second videos.

* * * * *